Sept. 14, 1965   S. A. LO VETERE   3,206,707
ELECTRONIC CIRCUIT TESTING APPARATUS
Filed May 16, 1963
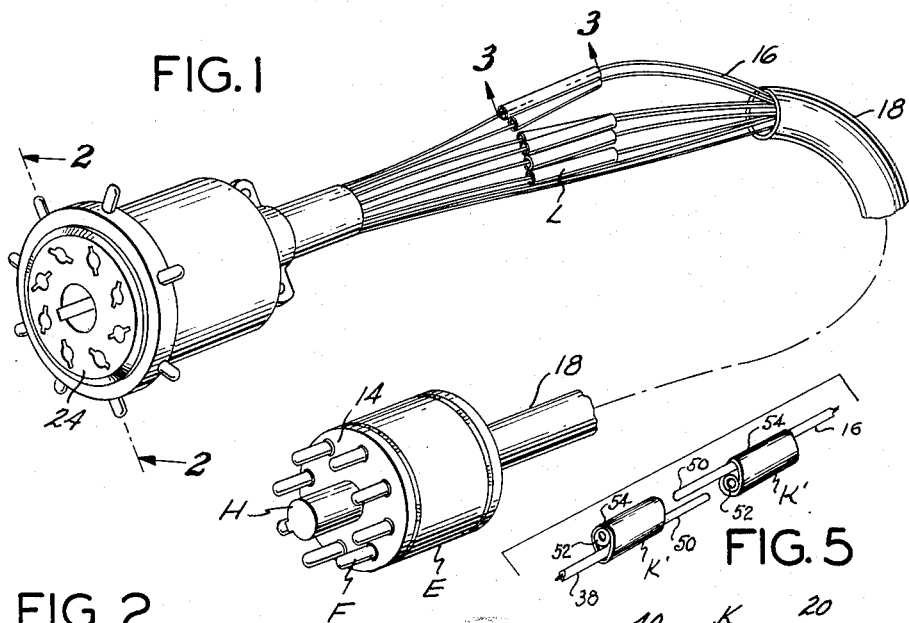
FIG. 1
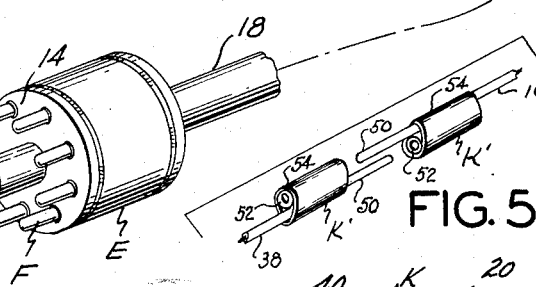
FIG. 5
FIG. 2
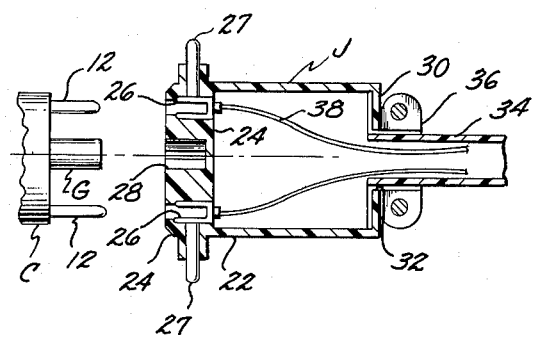
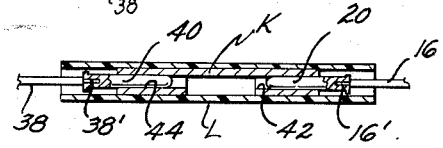
FIG. 3
FIG. 4
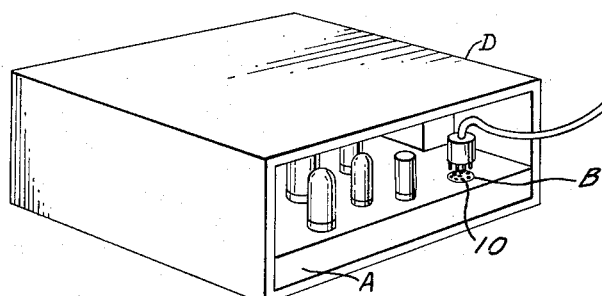
FIG. 6
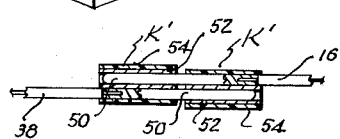
INVENTOR.
SAMUEL A. LO VETERE
BY
William C. Babcock
ATTORNEY

United States Patent Office 3,206,707
Patented Sept. 14, 1965

3,206,707
ELECTRONIC CIRCUIT TESTING APPARATUS
Samuel A. Lo Vetere, 8713 Mayne St., Bellflower, Calif.
Filed May 16, 1963, Ser. No. 280,894
4 Claims. (Cl. 339—28)

The present invention relates generally to the field of electronics, and more particularly to an improved electronic circuit testing apparatus.

A current trend in the design of radio and television sets, as well as in other devices embodying electronic circuits, is to place the circuits and components thereof in as compact a space as possible. However, because of such compact arrangement it is extremely difficult, if not impossible, to test a single circuit component such as a tube, capacitor, resistor, or the like, while the component is in an operating position in the circuit.

Also, heretofore it has been necessary in many instances to unsolder a component such as a capacitor or resistor from a circuit in order to test the same. Obviously, it is impractical to do such testing in a residence or other site of a television or radio set, and as a result, many of them must be transported to a suitable facility, such as a repair shop where such tests can be made. The time involved in so transporting radio and television sets from the home to the facility, and from the facility back to the home from which they were removed, necessarily increases the cost of repairs, without in any way benefiting the customer.

A major object of the present invention is to provide a simple, inexpensive device that permits vacuum tubes to be tested under actual operating conditions in the circuits from which they were taken, and by means of which device other components of the circuit such as resistors, capacitors, and plug-in type transistors may be tested, with this testing being carried out at the installation site of the radio, television set, or circuit.

Another object of the invention is to lessen the time required by a repairman in troubleshooting the cause of malfunctioning of a radio or television set, or other electrical circuit in which components such as plug-in type transistors, vacuum tubes, resistors and capacitors are employed.

A still further object of the invention is to provide a device that will tend to reduce the cost of repairs to radio and television sets in the home by minimizing the number of instances wherein such equipment will have to be transported to a repair shop for testing and then transported back to the home after the repairs have been made thereto.

These and other objects and advantages of the invention will become apparent from the following description of a preferred form thereof, and from the accompanying drawing illustrating that form in which:

FIGURE 1 is a perspective view of the circuit tester;

FIGURE 2 is a fragmentary, longitudinal cross-sectional view of the device taken on the line 2—2 of FIGURE 1;

FIGURE 3 is a fragmentary longitudinal cross-sectional view of a portion of the testing apparatus taken on the line 3—3 of FIGURE 1;

FIGURE 4 is a perspective view of the testing apparatus being used in testing an electronic circuit;

FIGURE 5 is a perspective view of the first alternate connectors; and

FIGURE 6 is a longitudinal cross-sectional view of a pair of the first alternate connectors in the made-up position.

With continuing reference to the drawing for the general arrangement of the invention, a typical electronic device A is shown in FIGURE 4, such as may be embodied in a television set, radio or the like. Device A includes a number of bases B, each of which has a number of spaced electrical conducting receptacles 10 that are adapted to be slidably engaged by base pins 12 of a conventional vacuum tube C, or other electronic component. The device A shown in FIGURE 4 is disposed in a housing D, which, as often is the case, is just sufficiently high to permit vacuum tube C to be placed in and removed from the bases B, but due to the restricted space within the housing, it is extremely difficult, if not impossible, to test the vacuum tubes when disposed in their normal position therein.

As shown in detail in FIGURES 1 to 3 inclusive, the tester comprises a first generally cylindrical plug E formed from an electrical insulating material such as a polymerized resin, or the like, and has a number of spaced prongs F projecting outwardly from a face 14 thereof. In size and spaced relationship prongs F are identical to the base pins 12 of the vacuum tube C to be tested, and are adapted to slidably engage the electrical conducting receptacles 10 shown in FIGURE 4. Receptacles 10, by means not shown, are connected to the device A and form a part thereof.

In some vacuum tubes C an aligning member G is also centrally disposed relative to the pins 12, and if the vacuum tube to be tested is of that type, a replica H of the aligning member also projects from the face 14 of the plug E, as may best be seen in FIGURE 1.

A number of first electrical insulated conductors 16 are provided which are in parallel relationship within the confines of a first tubular envelope 18 (FIGURE 1). One end of envelope 18 is affixed to the first plug E, and the conductors extend through the plug with each conductor being connected to one of the prongs F. Each conductor 16 is connected on a first end 16' thereof to an electrical conducting pin as may best be seen in FIGURE 3.

A second plug J is provided that is preferably of hollow construction, as shown in detail in FIGURE 2. The second plug J is defined by a cylindrical side wall 22 having a first end 24 in which a number of circumferentially spaced electrical conducting receptacles 26 are disposed. The first end 24 also has a centrally disposed cavity 28 formed therein that is adapted to slidably receive the aligning member G of vacuum tube C. Also, a number of circumferentially spaced, radially extending electrical conducting members 27 are embedded in end 24. The inner ends of members 27 are connected to receptacles 26, and members 27 are sufficiently long that the end portions thereof project outwardly beyond end 24.

The second plug J also includes a second end 30 in which a centrally disposed opening 32 is formed. A second tubular electrical insulating envelope 34 extends into the opening 32 and is removably held in this position by a conventional clamp 36. Each of the receptacles 26 has a second insulated electrical conductor 38 connected thereto which extends through the opening 32 into the interior of the second envelope 34. Each conductor 38 as an end 38' which is connected to a metallic pin 40.

A number of metallic electrical connectors K are provided, as may best be seen in FIGURES 1 and 3, each of which is capable of having a pin 20 inserted in a first end 42 thereof, and a pin 40 in a second end 44. When pins 20 and 40 are inserted in one of the connectors K they establish electrical communication between one of the receptacles 26 and one of the prongs F. Also, when the base pins 12 of vacuum tube C are slidably inserted in the receptacles 26, and the aligning member G in the cavity 28, the base pins 12 of vacuum tube C are in communication with corresponding prongs F in first plug E. As a result, when the prongs F are inserted in the receptacles 10 of base B, the circuit operates in the same manner as though the vacuum tube C were disposed therein, rather than in the second plug J. A number of tubular insulators L are provided which slide over the exterior of the connectors K and prevent them from coming into physical contact with one another, as best shown in FIGURES 1 and 3. The tube C to be tested is removed from the receptacle 10 and the prongs F of the plug E are then inserted into the base B. Base pins 12 of the tube C being tested are then inserted in the appropriate receptacles 26 of second plug J. Testing instrument M that may be a voltmeter, ammeter, or the like, is provided that has two insulated electrical conducting leads 46 and 48 extending therefrom which terminate in pins 20' and 40' respectively. Pins 20' and 40' are identical to pins 20 and 40 shown in FIGURE 3.

The testing can be carried out by physically placing the pin 20' in contact with the appropriate pin 20, and the pin 40' in contact with pin 40, and then taking a reading on the instrument M. In lieu of this procedure, additional connectors K can be provided, in which instance the pins 20 and 20' are removably disposed therein in the manner shown in FIGURE 3, with pins 40 and 40' in the second connector K. When this procedure is used, the hands are free to make adjustments or carry out other tasks while keeping the reading on instrument M under observation.

If it is desired, connections to instrument M may be effected, and a number of the members 27 connected to the instrument in the manner described. The pins 20' and 40' can be manually held in connection with desired ones of the members 27. Also, additional connectors K can be caused to engage the members 27, with the opposite ends of the connectors then being engaged by the pins 20' and 40'. Occasionally, in certain testing operations it may be desirable to determine whether a certain resistor or capacitor is defective. In such instances a new resistor or capacitor is provided (not shown) and the leads thereof connected to appropriate members 27, with the new capacitor or resistor then being shunt connected relative to the original resistor or capacitor remaining in the circuit A.

A pair of connectors K' of a first alternate form are shown in FIGURE 5. Each of the connectors K' includes a bayonet 50 that is adapted to be slidably inserted in an elongate receptacle 52 comprising a portion of the other connector. Each connector K' includes one of the receptacles 52, to the rear portion of which the rear of one of the bayonets 50 is soldered or otherwise electrically connected. The longitudinal side portion of each receptacle 52 and the portion of bayonet 50 disposed adjacent thereto are sheathed in an envelope 54 of an electrical insulating material. The bayonet 50 of one connector K' can slidably enter the receptacle 52 of the other connector when the two connetcors are pushed together from the positions shown in FIGURE 5. The bayonet 50 of one connector K' is connected to an electrical conductor 16, and the bayonet in the other connector of the pair, to an insulated conductor 38.

The first alternate form of connector K' is used in the same manner as connector K.

Although the present invention is fully capable of achieving the objects and providing the advantages hereinbefore mentioned, it is to be understood that it is merely illustrative of the presently preferred embodiments thereof and I do not mean to be limited to the details of construction herein shown and described, other than as defined in the appended claims.

I claim:
1. A device for use in checking the components of an electronic circuit that includes at least one base for removably receiving the base pins of a vacuum tube, comprising:
   (a) a first plug of an electrical insulating material;
   (b) a plurality of spaced electrical conducting prongs supported in said first plug that are identical to said base pins and are capable of removably engaging said base;
   (c) a plurality of first insulated electrical conductors connected to said prongs in said first plug;
   (d) a second electrically insulated plug;
   (e) a plurality of spaced electrical conducting receptacles in said second plug that are so spaced therein as a removably receive said base pins of said vacuum tube of the type that engages said base in said circuit;
   (f) a plurality of circumferentially spaced electrical conducting members supported in said second plug, each of which members are electrically connected to one of said receptacles, and each of which members have an outer exposed portion;
   (g) a plurality of second insulated electrical conductors connected to said receptacles in said second plug;
   (h) a plurality of first and second electrical conducting means on the free ends of said first and second electrical conductors; and
   (i) third means for removably holding said first and second means in electrical engagement to provide an electric circuit from said plug in said electronic circuit when said prongs of said first plug engage the same to said receptacles in said second plug, with said electronic circuit being completed when a tube of the type which was initially in said plug in said circuit having the prongs thereof in said receptacles, and said circuit then adapted to be checked in detail in an operating condition for required electric current, voltage, resistance and wattage by sequentially separating said first and second means and connecting them to an appropriate electrical instrument.

2. A device as defined in claim 1 wherein said first and second means are elongate cylindrical metallic pins.

3. A device as defined in claim 2 wherein said third means comprises a plurality of elogate metallic electrical conductors that are adapted to slidably receive said metallic pins.

4. A device as defined in claim 3 which further includes a plurality of tubular electrical insulators that are removably mounted on said electrical conductors and completely sheath and insulate said conductors from one another.

References Cited by the Examiner

UNITED STATES PATENTS 3,040,254  6/62  Griffiths et al. _____ 324—72.5 X

FOREIGN PATENTS 325,632  2/30  Great Britain.

JOSEPH D. SEERS, *Primary Examiner.*